United States Patent [19]
Marler

[11] Patent Number: 5,869,907
[45] Date of Patent: Feb. 9, 1999

[54] MODULAR WIRING HARNESS FOR A VEHICLE

[76] Inventor: Rick A. Marler, 405 College, Winfield, Kans. 67156

[21] Appl. No.: 590,341

[22] Filed: Jan. 23, 1996

[51] Int. Cl.$^6$ .................................................... H02B 1/04
[52] U.S. Cl. ........................... 307/10.1; 307/9.1; 361/826
[58] Field of Search ..................................... 307/9.1, 10.1,
307/10.3, 10.6, 10.8; 361/825–827, 828,
833, 835, 837, 627–631, 730, 743, 752,
753; 340/453, 425.5, 427, 475, 638, 639;
439/34; 315/77, 78, 80, 82; 362/61, 66;
290/38 R

[56] References Cited

U.S. PATENT DOCUMENTS

| | | | |
|---|---|---|---|
| H248 | 4/1987 | Middlebrooks | 340/639 |
| 3,859,540 | 1/1975 | Weiner | 290/38 R |
| 4,386,278 | 5/1983 | Kawada et al. | 307/9.1 |
| 5,067,056 | 11/1991 | Suzuki et al. | 362/66 |
| 5,428,519 | 6/1995 | Salmon et al. | 362/66 |
| 5,497,036 | 3/1996 | Zemlicka | 307/9.1 |

*Primary Examiner*—Richard T. Elms
*Attorney, Agent, or Firm*—Litman, McMahon and Brown, L.L.C.

[57] ABSTRACT

A modular wiring harness is provided for a vehicle including a frame and an electrical system with electrical source devices, operating devices and switching. The wiring harness includes a wiring network connected to the electrical system devices and switching and to system and power module thereof. The system module connects electrical control components at a compact, direct-connection circuit board within the enclosure. The power relay also includes electrical control components, including a circuit breaker and a starter relay, which are connected to the wiring network. A mounting system is provided for mounting the wiring harness on various types of vehicles, including different models of motorcycles.

22 Claims, 12 Drawing Sheets

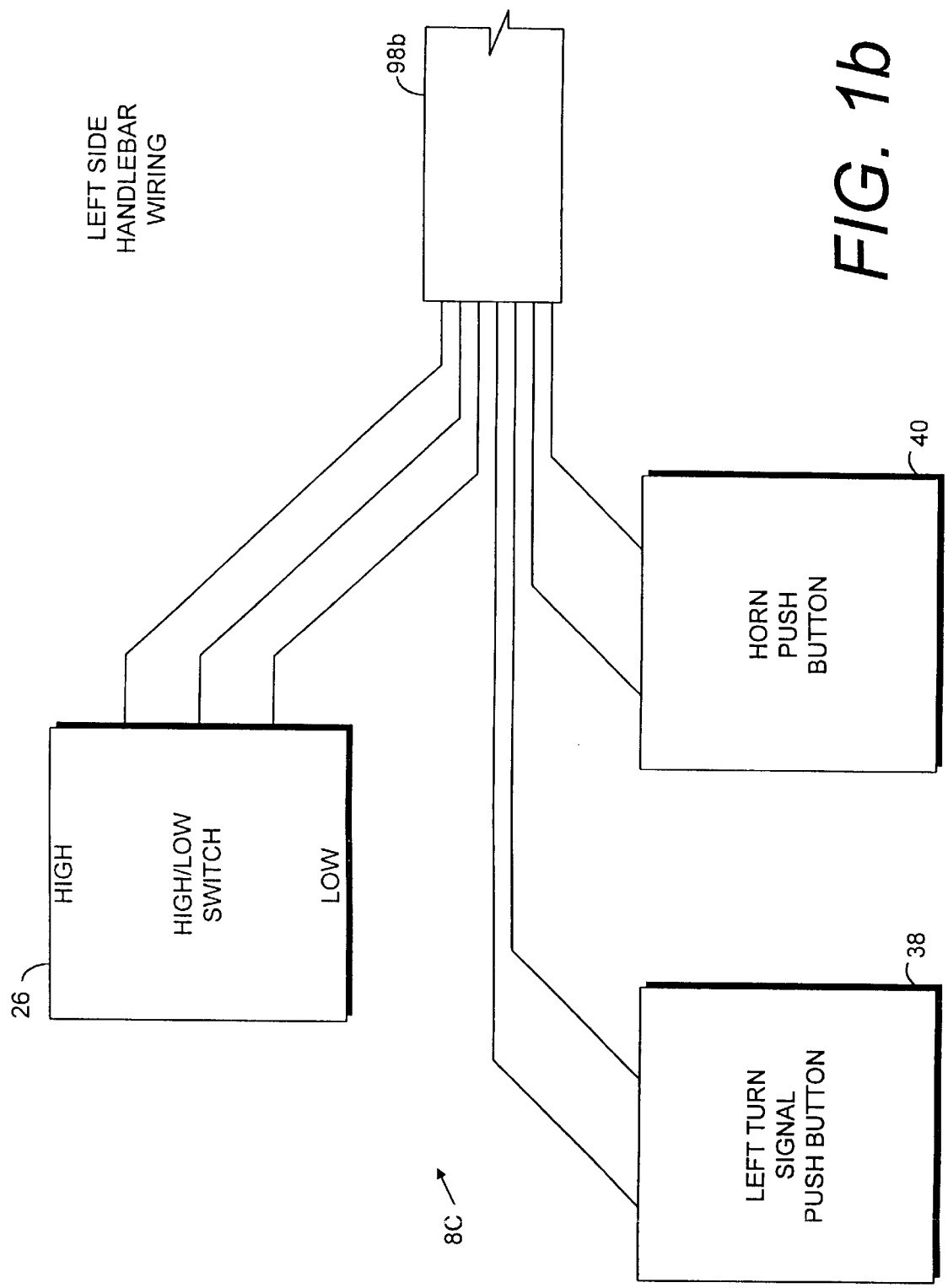

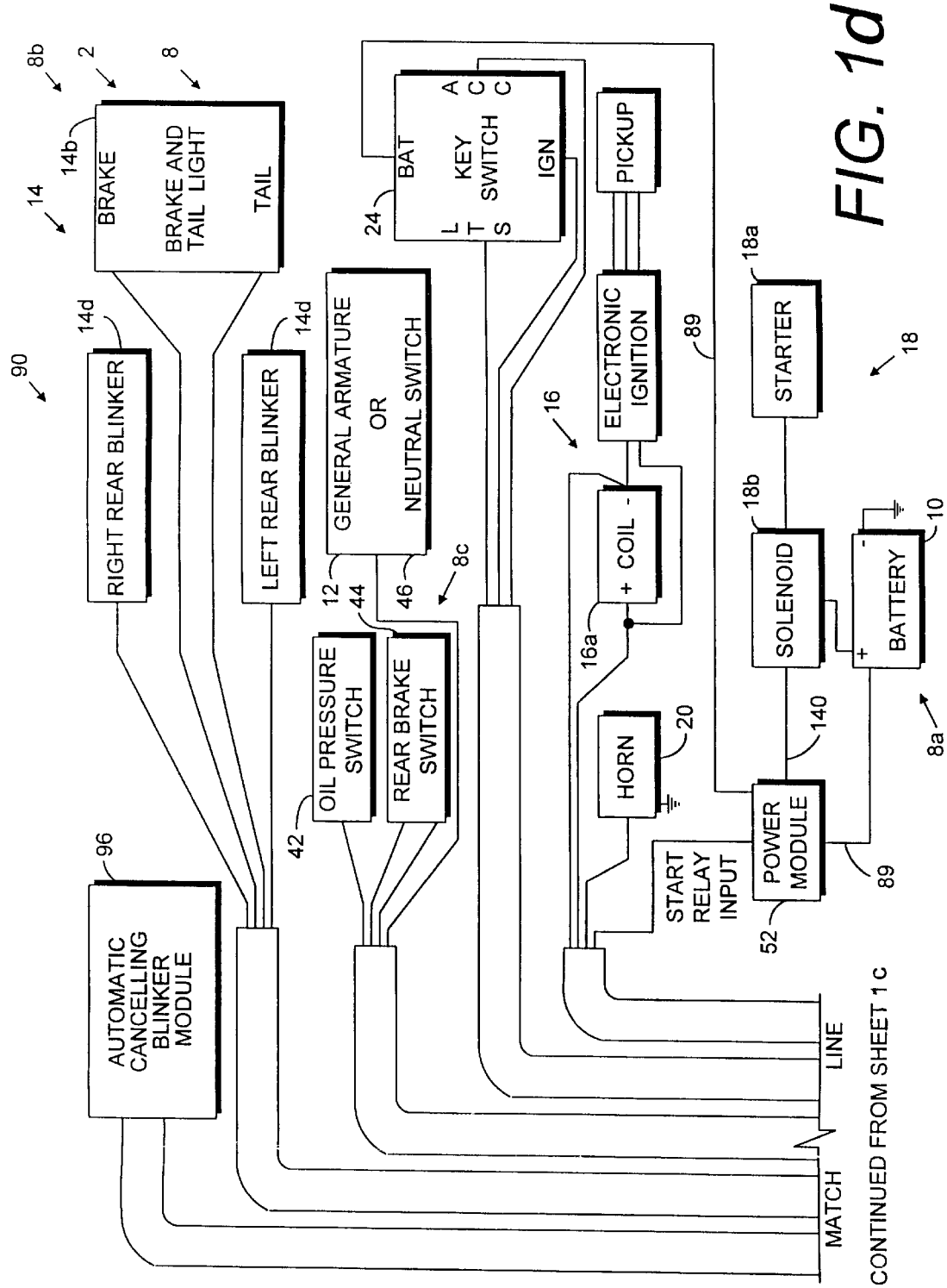

MODULAR WIRING HARNESS FOR A VEHICLE

BACKGROUND OF THE INVENTION

1. Field of the Invention

The present invention relates generally to vehicle electrical systems, and in particular to a modular wiring harness for motorcycles and other vehicles.

2. Description of the Related Art

Vehicles of various kinds employ electrical systems which can vary considerably in design, complexity and components. For example, land vehicles, watercraft and aircraft have different operational considerations which require different electrical system designs to meet the operating requirements for which each is intended. A wide range of electrical devices are used on different vehicle types for providing lighting, controlling engine operation, controlling conditions within the vehicle, navigation, etc.

Notwithstanding the considerable variety among vehicle electrical systems, most have several common features. For example, most include one or more sources of electrical current, such as batteries and current generating means comprising generators and alternators. Secondly, most vehicle electrical systems include operating devices which utilize such electrical power in connection with operating the vehicle. Thirdly, most vehicle electrical systems include switching for selectively activating the operating devices, either automatically in response to certain vehicle conditions (e.g., warning lights) or manually in response to operator input (e.g., headlights). Fourthly, wiring networks, which are often referred to as harnesses, are commonly employed for interconnecting the electrical system devices and switching.

On vehicles such as motorcycles with relatively open construction and exposed frames mounting various components, electrical system design and placement can be important for function and aesthetics since parts of the electrical system are normally exposed and often need to be accessible to an operator.

In addition to original equipment wiring harnesses which are installed when vehicles are manufactured, there is a considerable aftermarket for wiring harnesses and other electrical system components. For example, restoration, rebuilding and customizing of motorcycles is very popular, particularly with such models as Harley-Davidson motorcycles. Limited production of new Harley-Davidson motorcycles has created a considerable demand for used models, which are often rebuilt and customized. Motorcycles are often customized for their owner's enjoyment and also for display purposes at custom motorcycle shows.

For customizing purposes, the original wiring harnesses are often unsatisfactory because the wiring is not organized in a satisfactory manner and the electrical components, particularly control components such as circuit breakers, relays, flashers and the like, are distributed at various locations on the motorcycle. Moreover, many existing motorcycle wiring harnesses lack diagnostic devices for verifying the proper operation of the devices, switching and wiring and for isolating faults therein.

A solution is to provide one or more circuit boards for a vehicle which mount the various electrical control components and connect same to the wiring. Such circuit boards can be enclosed within enclosures which are preferably located at conveniently accessible locations on the vehicle. Previous electrical enclosures have tended to be relatively large and thus created problems in finding suitable locations for them on vehicles such as motorcycles with limited space. The oversized nature of such previous electrical enclosures was a result of their designs, which typically involved running circuit board traces from a circuit board to a terminal strip located at the edge or edges of the circuit board and providing a terminal thereat for connection to the vehicle wiring system. Such circuit board traces comprised conductive materials, such as copper, and were sufficiently large to accommodate the electrical current loads encountered in the electrical system. The terminal strips and connections thus added considerably to the space requirements for previous enclosed circuit boards.

Other considerations involved in vehicle electrical system design relate to protecting the circuit board connections and the electrical control components from the elements and with providing vibration-resistant electrical connections. For example, typical solder connections are made by wicking solder on to exposed ends of wire leads preparatory to making the solder connections. However, vibration can induce fatigue breakage of the individual conductor strands at the locations where the solder wicking stops.

Heretofore there has not been available a modular wiring harness with the advantages and features of the present invention.

SUMMARY OF THE INVENTION

In the practice of the present invention, a modular wiring harness is provided for a vehicle including a frame and an electrical system with electrical source devices, operating devices and switching. The wiring harness includes a wiring network connected to the source devices, the operating devices and the switching. The wiring harness also includes a system module with an enclosure having a base with a wire opening receiving the wiring. A circuit board is mounted in the base and is connected to the wiring. Electrical control components, such as circuit breakers and a flasher unit, are mounted on the circuit board within the enclosure. The enclosure includes a cover mounted on the base in a sealing engagement therewith. The system module includes an array of indicator lights connected to the wiring for indicating performance of the electrical system devices, switching and wiring. A power module is connected to the wiring and includes a circuit breaker, a starter relay and indicator lights. Alternative mounting arrangements are provided whereby the system and power modules can be mounted at various locations on various vehicles, for example, different models of motorcycles.

OBJECTS AND ADVANTAGES OF THE INVENTION

The principle objects and advantages of the present invention include: providing a modular wiring harness for a vehicle, providing such a wiring harness which is relatively easy to produce in various configurations; providing such a wiring harness which is adaptable to various types of vehicles; providing a wiring harness with indicator lights for troubleshooting all circuits thereof; providing a wiring harness with one or more modules which enclose all electrical connections thereat; providing such a wiring harness which eliminates a number of exposed electrical connections as compared to previous wiring harnesses; providing such a wiring harness with one or more modules substantially filled with a nonconductive potting material, such as epoxy; providing such a wiring harness which utilizes spade-type electrical connectors with the receivers thereof embedded in potting materials for resisting vibration and for protection against the elements; providing such a wiring harness which utilizes potting material for minimizing its space requirements by encapsulating circuit board connections thereof; providing such a wiring harness which is adaptable for use with various electrical source devices, operating devices, switching and wiring; providing such a wiring harness with one or more system and power modules which can contain various electrical control components; providing such a wiring harness wherein the modules effectively protect the components therein; providing such a wiring harness wherein the modules are relatively compact in size; providing such a wiring harness wherein the modules are resistant to vibration; providing such a wiring harness wherein the modules are aesthetically pleasing in appearance; providing such a wiring harness wherein the modules can be mounted at various locations on different motorcycle models; providing such a wiring harness which is adaptable for a wide range of vehicles, including motorcycles and other land vehicles, watercraft and aircraft; and providing such a wiring harness which is economical to manufacture, efficient in operation, capable of a long operating life and particularly well adapted for the proposed use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1b is a schematic diagram of the components of the modular wiring harness which are associated with the left handlebar of a motorcycle.

FIG. 1d is a schematic drawing of the right portion of a modular wiring harness embodying the present invention.

FIG. 4a-1 is a perspective view of the system module and power module mounting arrangement, with the power module positioned bottom-down.

FIG. 4a-2 is a perspective view of the system module and the power module, with a side-down alternative orientation of the latter.

DETAILED DESCRIPTION OF THE PREFERRED EMBODIMENTS

I. Introduction and Environment

Figure 1:
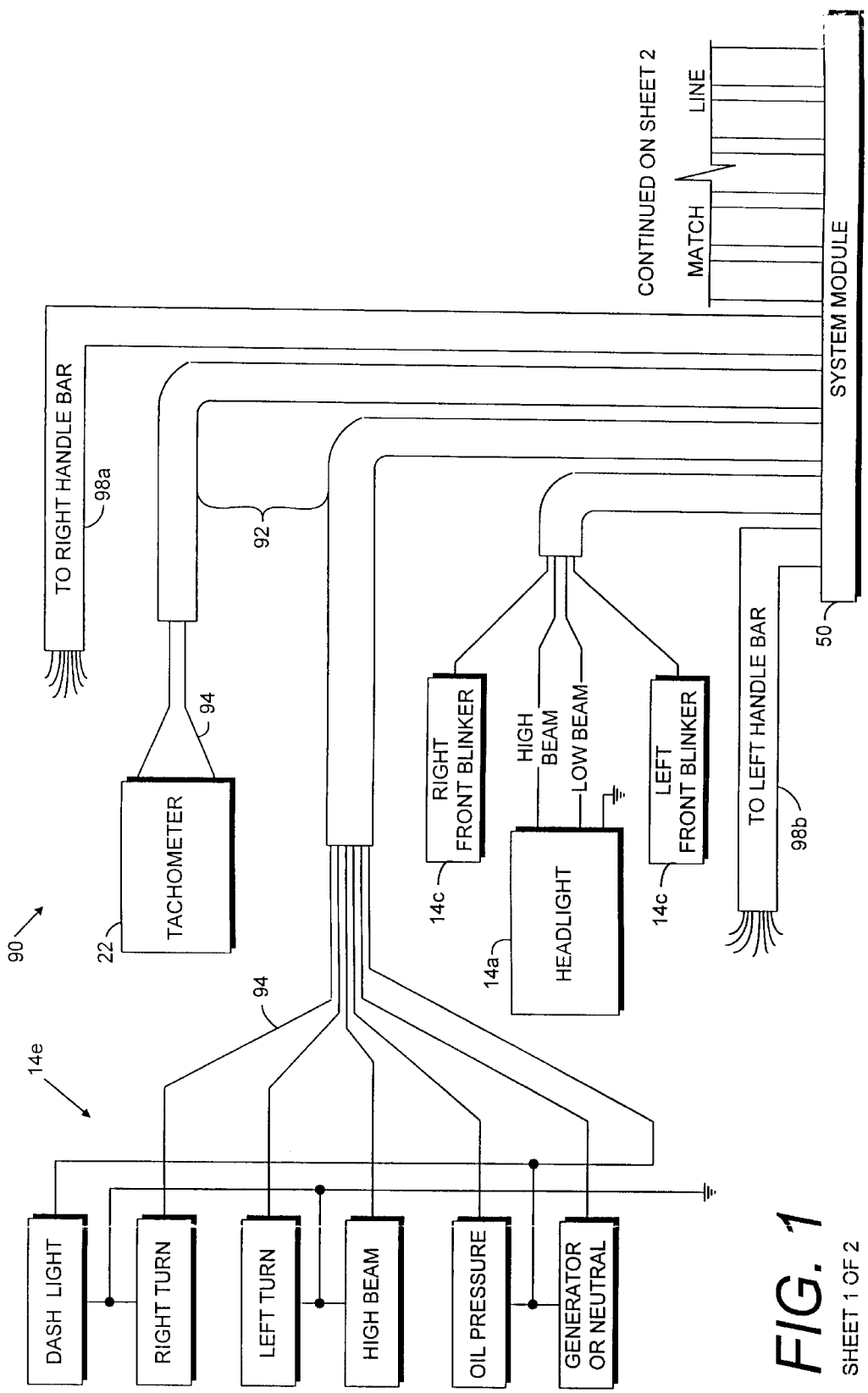
FIG. 1 is a schematic drawing of a modular wiring harness embodying the present invention.
Figure 1A:
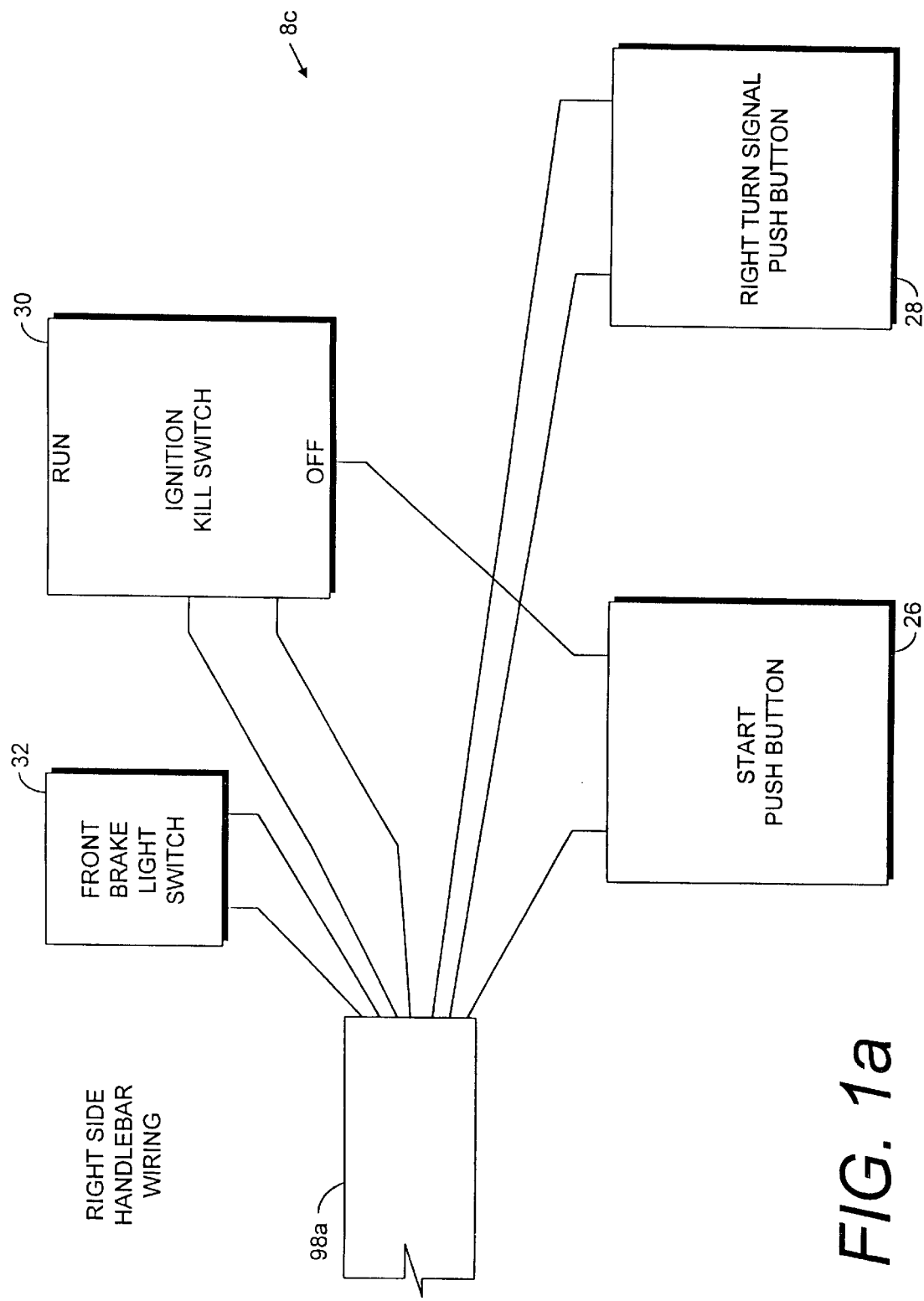
FIG. 1a is a schematic diagram of the components of the modular wiring harness which are associated with the right handlebar of a motorcycle.
Figure 1C:
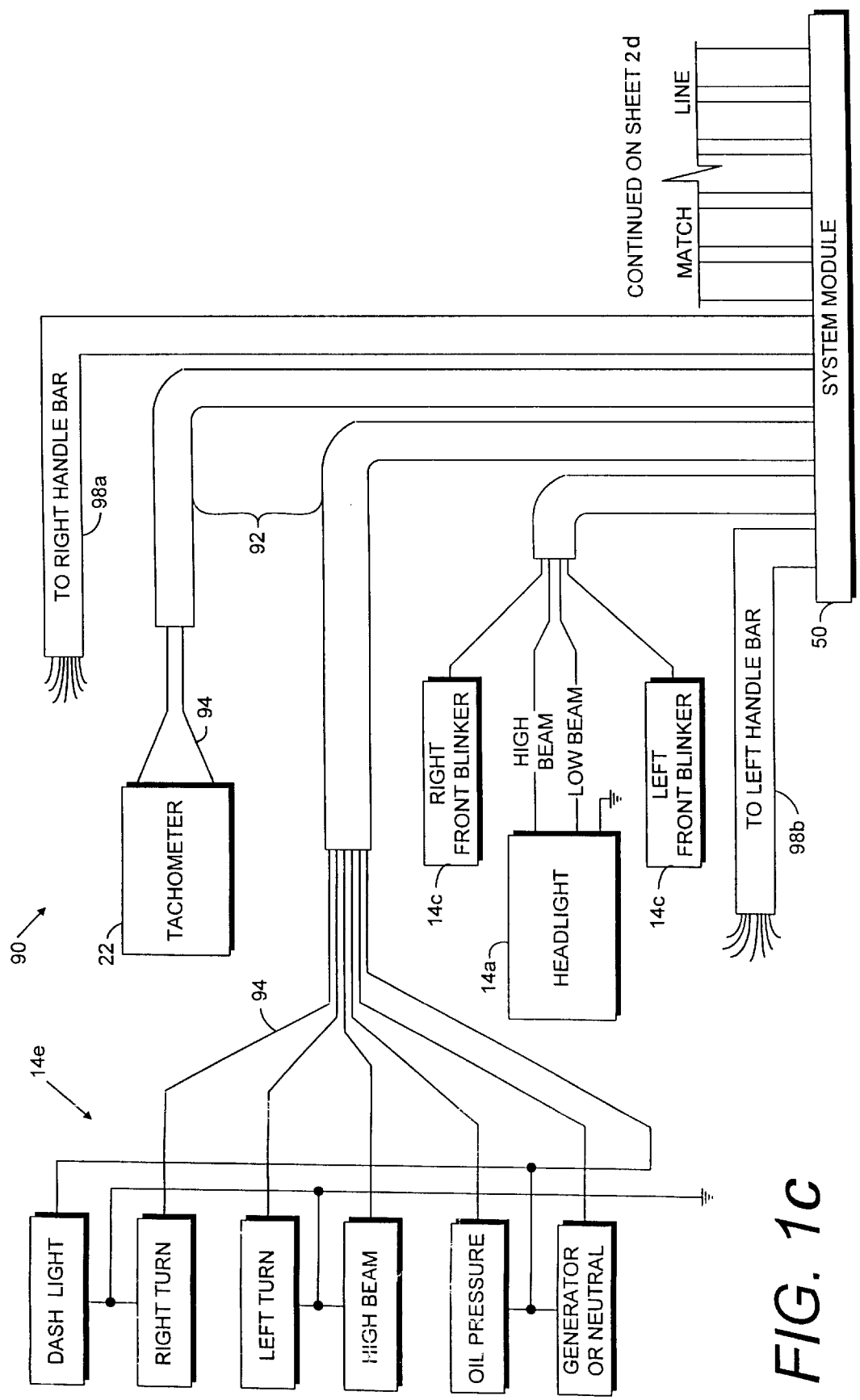
FIG. 1c is a schematic drawing of the left portion of a modular wiring harness embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a modular wiring harness for a vehicle 4 comprising, for example, a motorcycle. The motorcycle 4 includes a frame 6 with a front subframe (i.e., wheel/fork/handlebar) assembly 6a including right and left handlebars 7a, 7b. The front subframe assembly 6a is pivotally mounted on a front end of the frame 6.

Although the wiring harness 2 is shown and described in combination with a series of motorcycles 4a–d, all of which are Harley-Davidson motorcycles, it will be appreciated that wiring harnesses embodying the present invention can be utilized in a wide variety of different vehicles, including other motorcycles, automobiles, trucks, watercraft, aircraft, etc. The wiring harness 2 generally comprises system and power modules 50, 52; a wiring network 90; and a mounting system 9 for mounting same to the vehicle 4.

II. Vehicle Electrical System 8

The vehicle 4 includes an electrical system 8 which generally includes the wiring harness 2, source devices 8a, operating devices 8b and switching 8c.

The electrical source devices 8a include an electrical storage battery 10 and generator means comprising a generator or alternator 12.

The operating devices 8b include a lighting system comprising, for example, a headlight 14a, a tail/brake light 14b, front turn signals 14c, rear turn signals 14d and an array of dash lights 14e which indicate the operation of various other vehicle operating devices. An ignition system 16 includes a coil 16a and an electronic ignition or points 16b. A starter system 18 includes a starter 18a and a starter solenoid 18b. The operating devices 8b can also include a horn 20, an electronic tachometer 22 and an automatic cancelling blinker module 96.

The switching 8c includes an ignition switch 24 which can be keyed and can include positions for "ignition", "lights", "accessories" and "battery" for energizing various components of the electrical system 8. On the motorcycle 4, a substantial portion of the switching 8c is mounted on the handlebars 7. For example, the right side handlebar 7a can include a starter switch 26, a right turn switch 28, and an ignition kill switch 30. The left side of the handlebar 7b can include a high beam/low beam switch 36 for the headlight 12a, a left turn signal switch 38 and a horn switch 40.

In addition to the switches described above which are normally placed within easy reach (e.g., on the handlebars 7), other switches are remotely located and operate automatically. These include an oil pressure switch 42, a rear brake switch 44 and a generator armature or neutral switch 46. A front brake light switch 32 is mounted on is mounted on the right side handlebar 7a for automatic operation by a handlebar brake handle (not shown).

The electrical system 8 described thus far is for a motorcycle. It will be appreciated that electrical systems for other types of vehicles could be similar in many respects. Moreover, vehicle electrical systems are nearly as varied as vehicles themselves, and can include a wide variety of devices and switching. The modular wiring harness 2 of the present invention could be utilized with a wide variety of different vehicles and electrical systems with suitable modifications. For example, various other operating devices such as radios, sound systems, clocks, additional lighting and other accessories can be included in a vehicle electrical system.

III. System Module 50

The system module 50 includes an enclosure 54 including a base 56 with a base rim 56a, a base bottom panel 56b, base sidewalls 56c, and a wire opening 56d. The enclosure 54 further includes a cover 58 with a cover rim 58a, a cover front or top panel 58b and cover sidewalls 58c. A gasket 60 is placed between the base and cover rims 56a, 58a for effectively sealing an interior 62 of the enclosure 54 when the cover 58 is mounted on the base 56.

A circuit board 64 is mounted in the base 56 and can be configured appropriately for the devices and switching which are wired through the system module 50. For example, in the disclosed embodiment multiple spade connector receivers 66a are mounted on the circuit board 64 for receiving respective spade connector blades 66b of circuit breakers 68 and a flasher unit 70 for the turn signals 14c,d.

A pin receiver 72 is located in the enclosure interior 62 and receives connector pins 74 of an LED troubleshooting indicator light array 76 with indicator light units 76a–l connected to operating devices 8b as follows:

76a—ignition breaker
76b—accessory breaker
76c—light breaker
76d—"ignition" key input
76e—coil
76f—"accessory" key input
76g—brake light
76h—horn
76i—headlight (high and low beam)
76j—"lights" key input
76k—start button input
76l—starter relay output The LED units 76a–k are grounded and thus illuminate when a sufficient potential is present across them, i.e., when a respective operating device 8b is energized or a switch is opened or closed.

The enclosure 54 is secured together by a pair of screw posts 81 which receive enclosure assembly screws 83 through the enclosure base 56 and cover 58 for assembling the enclosure 54 with the gasket 60 clamped between the base and cover rims 56a, 58a. The cover top/front panel 58b includes a pair of receivers 58d with counterbores 58e for receiving O-rings 61 which sealing engage the cover receivers 58d and the enclosure assembly screws 83.

The wiring network 90 includes multiple ribbons 92, each of which comprises a number of wire leads 94 which connect to various electrical system source devices 8a, operating devices 8b and switching 8c.

An exemplary wiring ribbon schedule is as follows:

ribbon No. 1—indicator lights 14e
ribbon No. 2—ignition switch 24
ribbon No. 3—oil pressure switch 42, rear brake switch 44 and generator armature or neutral switch 46
ribbon No. 4—tail/brake light 14b and rear turn signals/blinkers 14d
ribbon No. 5—headlight 14a and front turn signals/blinkers 14c
ribbon No. 6—coil 16a, ignition/points 16b, horn 20 and starter relay 88/power module 52
ribbon No. 7—tachometer 22
ribbon No. 8—automatic cancelling blinker module 96.

The wiring 90 further includes first and second cables 98a, 98b extending along the right and left handlebars 7a, 7b respectively and connected to the switches located thereon.

The wiring 90 is connected directly to the circuit board 64 within the enclosure 54 by suitable connections, such as solder, such eliminating the need for terminal strips, wire traces away from the circuit board and external connections, all of which would increase the space requirements needed for mounting the system module 50. The base 56 is substantially filled with a suitable nonconductive potting material 63 (e.g., epoxy) within the enclosure interior 62 which substantially encapsulates the circuit board 64 and protects its connections to the wiring 90 and further secures same against the effects of vibration, etc. A variety of such potting materials are available, and can include epoxy, hot melt materials, etc. The potting material 63 cooperates with the wiring 90, the circuit board 64 and spade connectors 66 to accomplish several objectives. Firstly, the spade connector receivers 66a are substantially embedded within the potting material 63, whereby components such as the circuit breakers 68, 87 and the flasher unit 70 can be directly connected by their respective spade connector blades 66b to the spade connector receivers 66a and securely retained in the enclosures 54, 55 by the relatively secure anchoring of the spade connector receiver 66a within the potting material 63. Secondly, the potting material 63 encapsulates and insulates electrical connections between the various wiring harness 2 components, such as the wiring network 90, the circuit boards 64 and the other components for protection against the elements in order to resist corrosion, etc. Thirdly, the potting material 63 resists vibration associated with operation of the vehicle 4, thus reducing the risk of a spade connector 66 working loose or a fatigue break occurring in a conductive component of the wiring harness 2, such as the wiring network 90. The potting material 63 tends to restrain the spade connector receivers 66a to prevent them from spreading over time, possible under the influence of vibration or corrosion, whereby a faulty connection could occur. Fourthly, the use of the potting material 63 for encapsulating the spade connector receivers 66a, the circuit breaker 68 and certain ends of the wire leads 94 permits miniaturization of the system and power modules 50, 52 by eliminating the need for circuit board traces, terminal strips, external connectors, etc.

IV. Power Module 52

Figure 2:
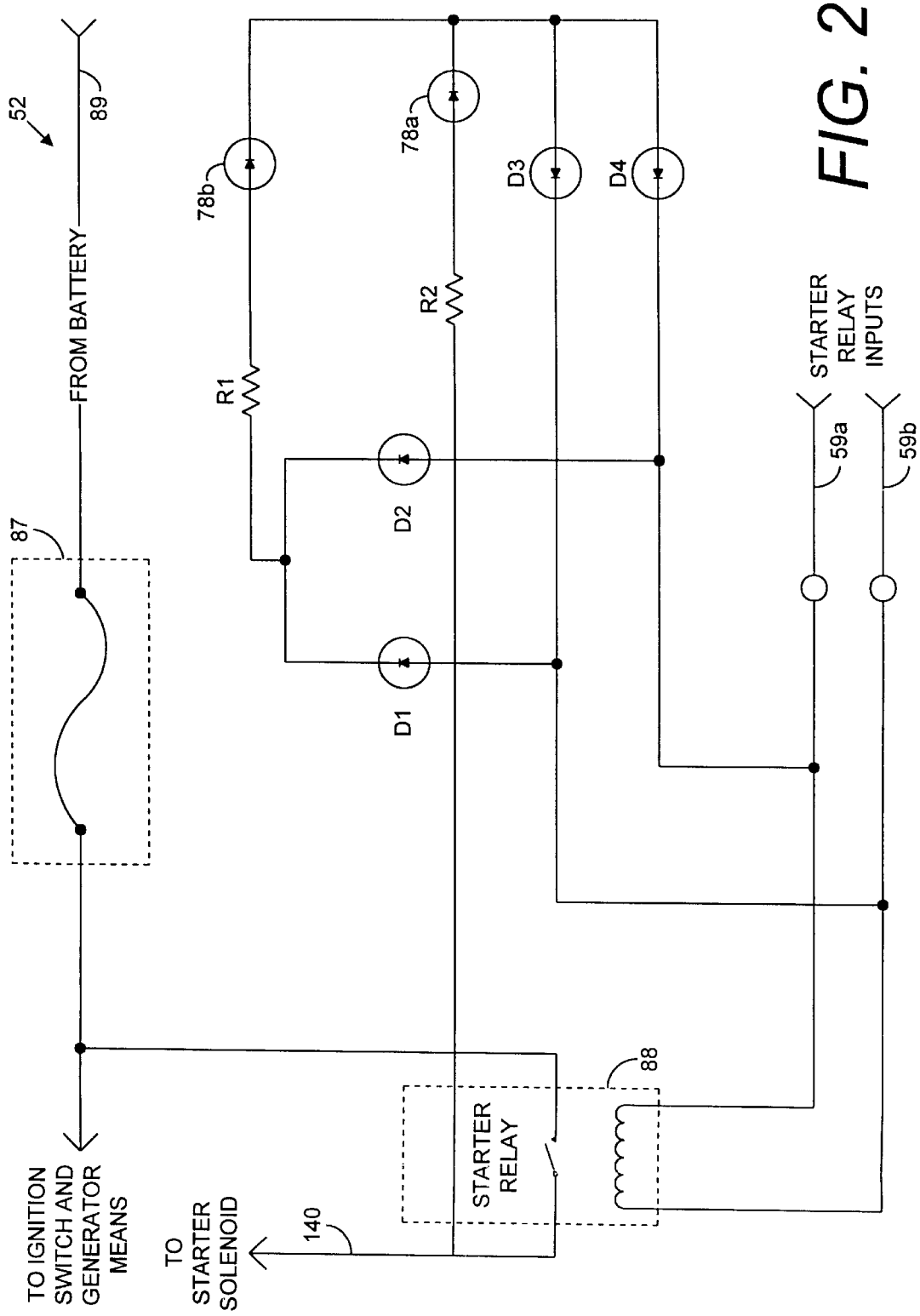
FIG. 2 is a schematic diagram of a power module of the wiring harness.
Figure 3:
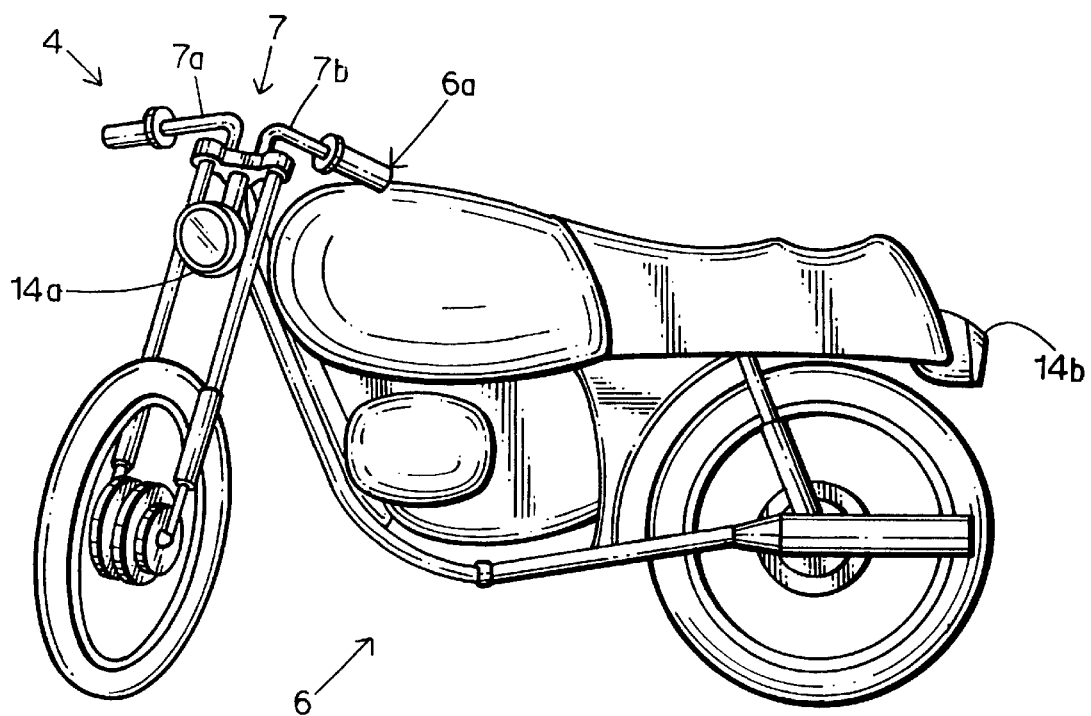
FIG. 3 is a side elevational view of a motorcycle, which can be fitted with the modular wiring harness.
Figure 4A:
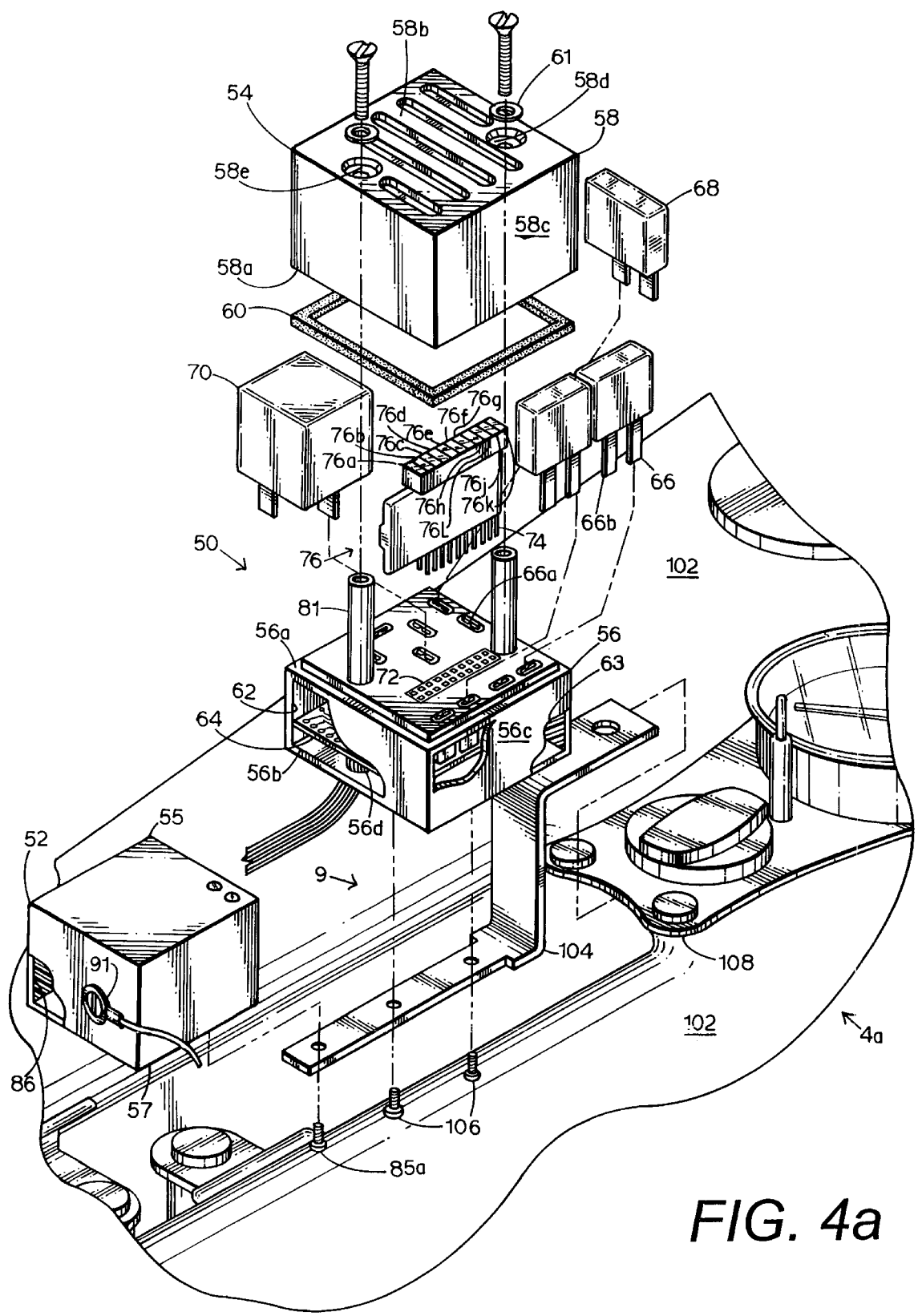
FIG. 4a is a perspective view of an installation of the modular wiring harness on a first type of motorcycle.
Figures 1, 4A:
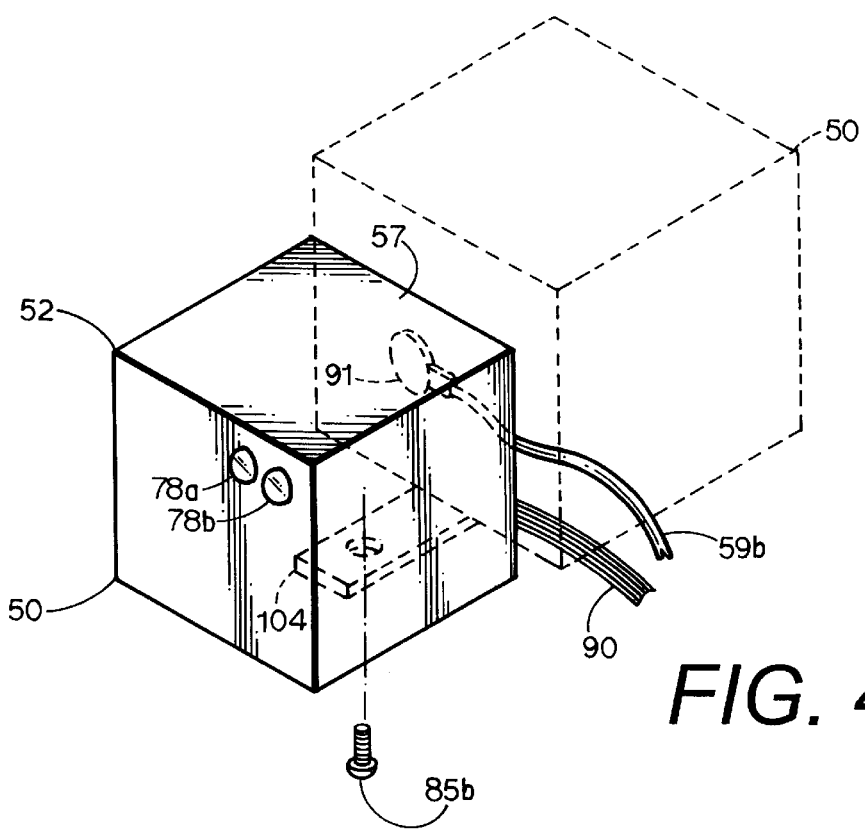
Figures 2, 4A:
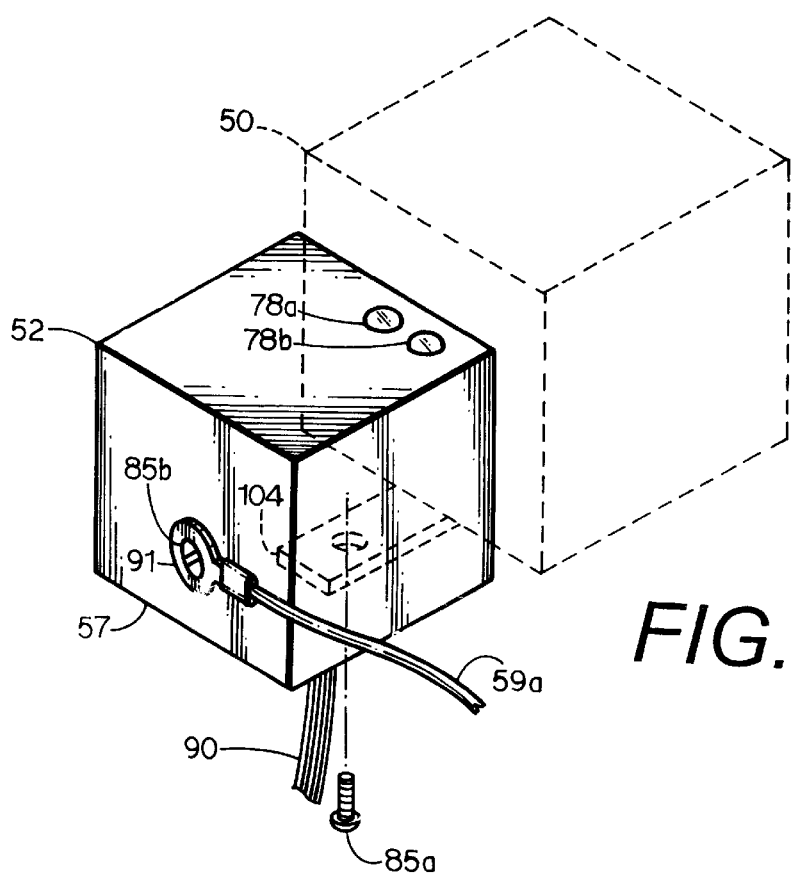

A schematic diagram of the power module 52 is shown in FIG. 2. Installations of the power module 52 are shown in FIGS. 4a, 4a-1 and 4a-2. The power module 52 includes an enclosure 55 with an open bottom 57 which receives wiring 90. The main power line 89 from the positive side of the battery 10 enters the enclosure 55 and is connected to a main (e.g., 30 amp) circuit breaker 87, which is connected to a starter relay 88. Closing the starter relay 88 energizes the starter solenoid 18b for activating the starter 18a. The starter relay 88 is actuated by the starter switch 26 which is connected through the system module 50 to one of the starter relay leads 59a,b through one of the power module bottom and side mounting screws 85a,b. Either power module mounting screw 85a,b can be utilized for mounting the power module 52 for either a bottom-down or a side-down orientation of the power module 52 since reversing the polarity of the potential applied to the starter relay 88 has no effect on its operation and current can flow in either direction therethrough.

A starter input LED unit 78a is connected to the leads 59a,b to the starter relay 88 through diodes D1, D2 and resistor R1 and through diodes D3, D4 back to the leads to the starter relay leads 59a,b. A starter relay output indicator LED unit 78b is connected to the starter relay output 140 which connects to the starter solenoid 18b through a resistor R2. The LED unit 78b grounds to the appropriate grounded starter relay lead 59a or 59b through one of the diodes D3 or D4. LED unit 78a will thus illuminate upon proper functioning of the starter relay input and the LED unit 78b is illuminated by output from the starter relay 88. Thus, illumination of the starter relay input LED unit 78a without the starter relay output LED unit 78b also being illuminated would indicate a defective starter relay 88. If neither starter relay LED unit 78a,b illuminates when the starter switch 26 is closed, a defective starter switch 26 or defective wiring leading therefrom would be indicated. The wiring 90 for the starter 18 also passes through the system module 50 and is coupled to the starter relay input indicator lights 76k, which facilitate troubleshooting of the circuits associated with the starter 18 for detecting faults therein. For example, a defective starter switch or wiring therefrom would be indicated in if the starter switch 26 were closed and the system module starter relay input indicator light 76k failed to illuminate. Normal operation of the starter relay 88 is indicated by illumination of the LED units 76k and 78a,b.

Modules such as those shown at 50, 52 can be assembled and utilized in the wiring harness 2 as required to meet the requirements of particular applications. For example, additional modules may be added, the functions of the modules 50, 52 can be split up into additional modules, or the functions of the modules 50, 52 can be combined into a single module. The circuit breaker, flasher, indicator light array and relay components can be selected and matched to particular components to meet the requirements of particular vehicle electrical systems.

V. Mounting System 9

The mounting system 9 is adapted to accommodate various motorcycles 4. For example, the motorcycle model depicted at 4a (FIG. 4a) has twin fuel tanks 102 between which the system and power modules 50, 52 are mounted by means of a two-module bracket 104, which attaches to the modules 50, 52 by means of enclosure mounting screws 106 and power module mounting screws 85a (bottom) or 85b (side).

In the mounting on the motorcycle 4a, the wire openings 56d in the enclosure 50 are located in the base bottom panel 56 thereof whereby all wiring ribbons 92 and the cables 98 enter and exit enclosure 54 through the bottom panel 56 thereof.

The two-module mounting bracket 104 is connected to a dash plate 108 by bolting same generally under the ignition switch 24. The power module 52 can be mounted on the two-module mounting bracket 104 with its bottom down using the bottom power module mounting screw 85a (FIG. 4a-1) or on its side using the side power module mounting screw 85b (FIG. 4a-2). The starter relay 88 is grounded through the mounting bracket 104 through whichever of the power module mounting screws 85a, 85b is utilized. A connector 91 is electrically attached to the other power module mounting screw 85a, 85b and is connected by a wire lead 94 to the starter switch 26 through the system module 50 and within the power module interior 86 to the starter relay 88. Thus, the mounting screw 85a or 85b by which the power module 52 is connected to the mounting bracket 104 determines the polarity of the starter relay 88. The starter relay 88 functions equally well with either polarity orientation thereof, thus permitting alternative mountings without effecting operation. The motorcycle 4a is sometimes referred to as a "Fat Bob" model.

Figure 4B:
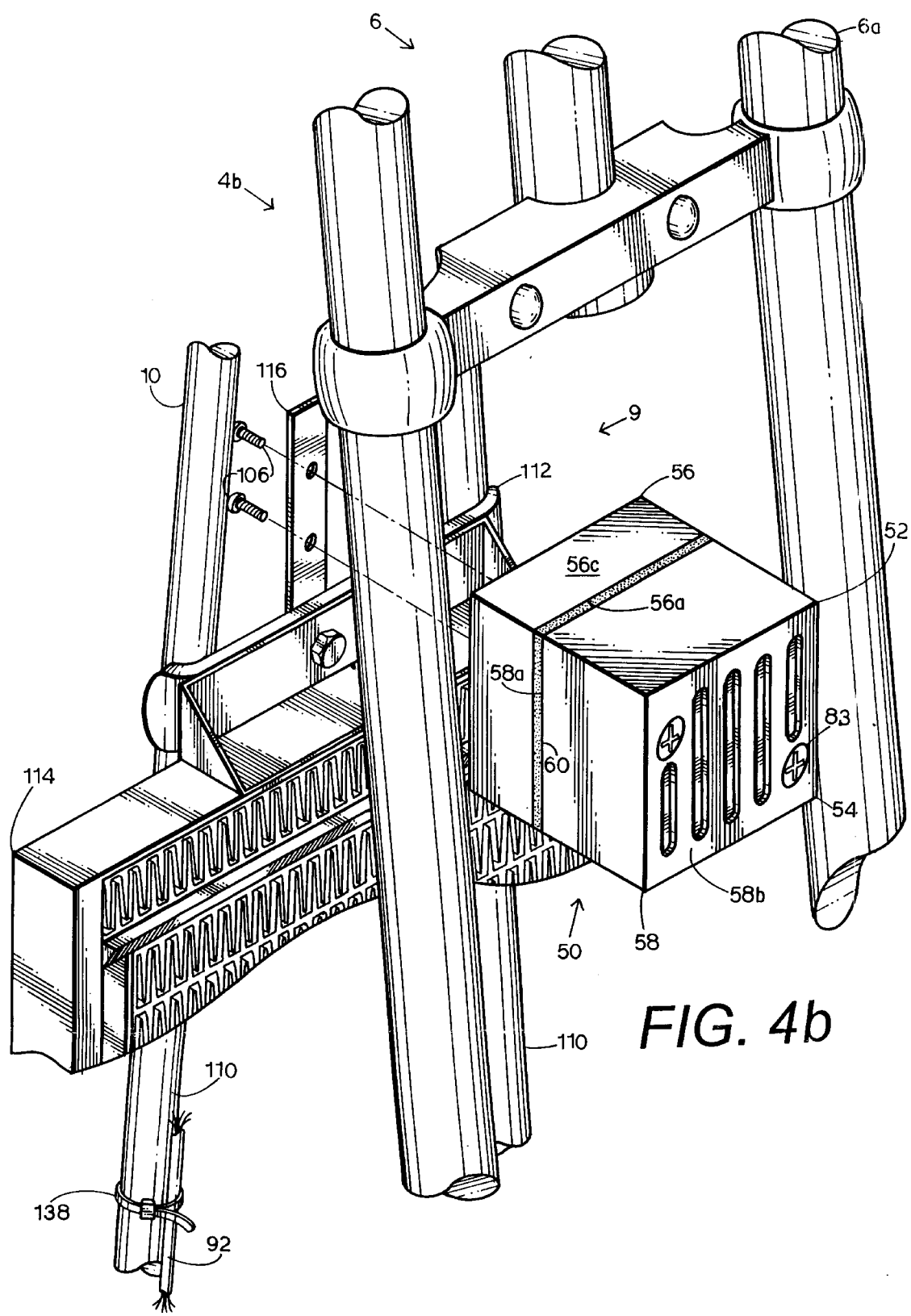
FIG. 4b is a perspective view of an installation of the modular wiring harness on a second type of motorcycle.

A first modified or alternative mounting for the wiring harness 2 on a motorcycle 4b is shown in FIG. 4b. The motorcycle 4b includes a pair of crash bars 110 which extend along the lower and front portions of its frame 6 and are connected by a crossbar 112 which mounts an oil cooler 114. A crossbar mounting bracket 116 is secured to the crossbar 112 and to the system module 50. The power module 52, if utilized with the motorcycle 4b, can be mounted at the location of the starter relay provided with the motorcycle. Since the power module 52 includes a starter relay 88, it can normally replace the original starter relay. The motorcycle 4b is sometimes referred to as a "Universal Big Twin" model.

For the installation on the motorcycle 4b, the wiring 90 is split into two branches, one of which connects to the handlebars 7 and the headlight 14a and exits through the top of the system module 50. The other wiring 90 branch contains the ribbons which connect to the ignition switch 24, the tail/brake light 14b, the starter 18 and the indicator array 76.

Figure 4C:
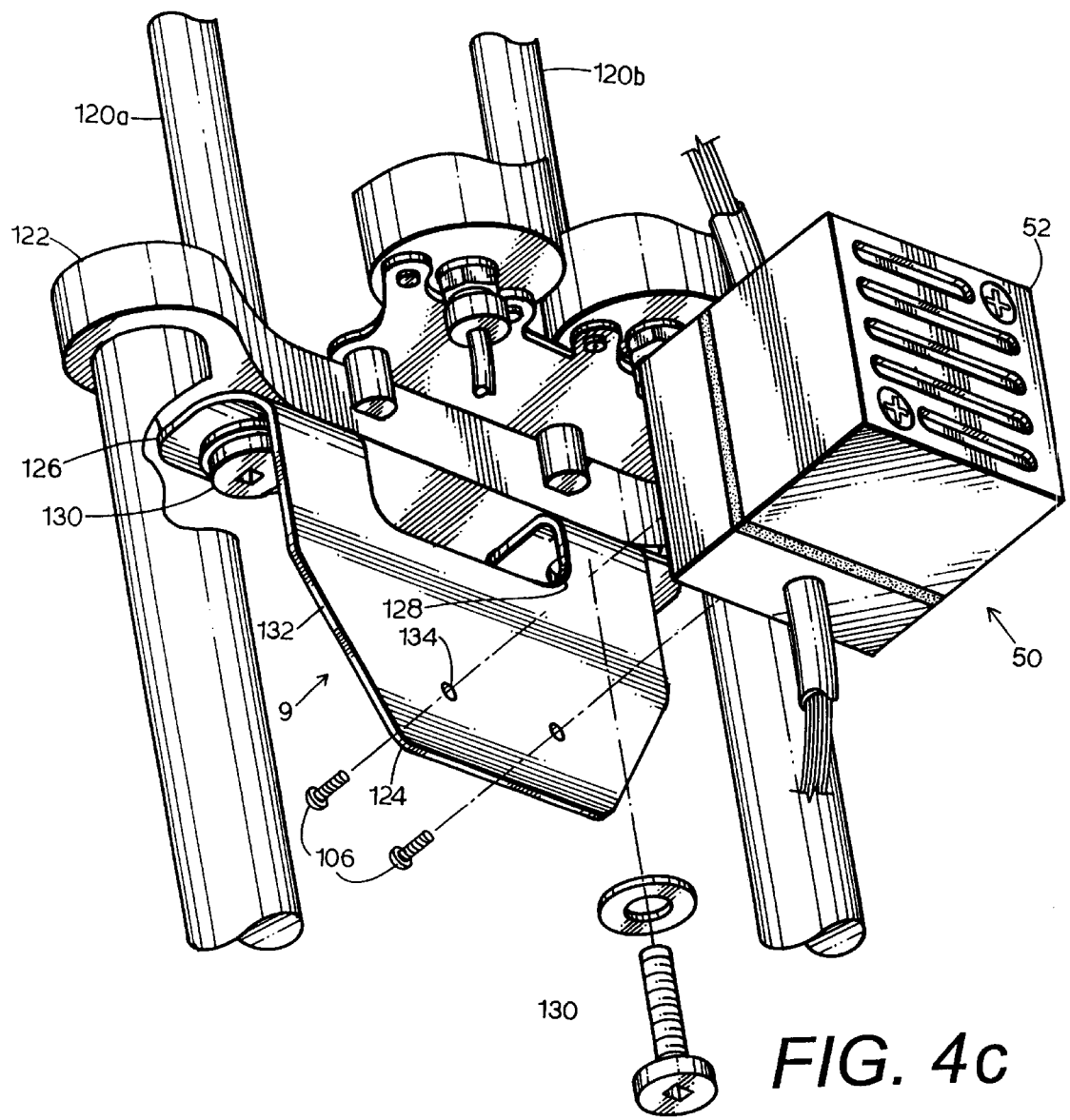
FIG. 4c is a perspective view of an installation of the modular wiring harness on a third type of motorcycle.

FIG. 4c shows a motorcycle 4c, which is sometimes referred to as having a "triple tree", which comprises a central pivotal tube for pivotally connecting the motorcycle frame 6 to the front wheel fork/handlebar assembly 6a. A pair of handlebar risers 120a,b are connected by an upper riser bracket 122 to the front subframe (wheel/fork/handlebar) assembly 6a. A universal triple tree mounting bracket 124 includes an upper flange 126 with a pair of receivers 128 which receive handlebar riser bolts 130. The universal triple tree mounting bracket 124 also includes a vertical plate 132 with system module mounting receivers 134 which receive system module mounting screws 106 for mounting the system module 50. The wiring 90 includes a primary harness which exits the bottom side of the system module and connects to devices and switches on the bottom and back of the motorcycle 4c. These include the ignition switch 24, the tail/brake light 14b, the starter 18 and the devices and switches connected to the troubleshooting indicator light LED array 76. A secondary harness is connected to the devices and switches associated with the handlebars 7 and the headlight 14a.

Figure 4D:
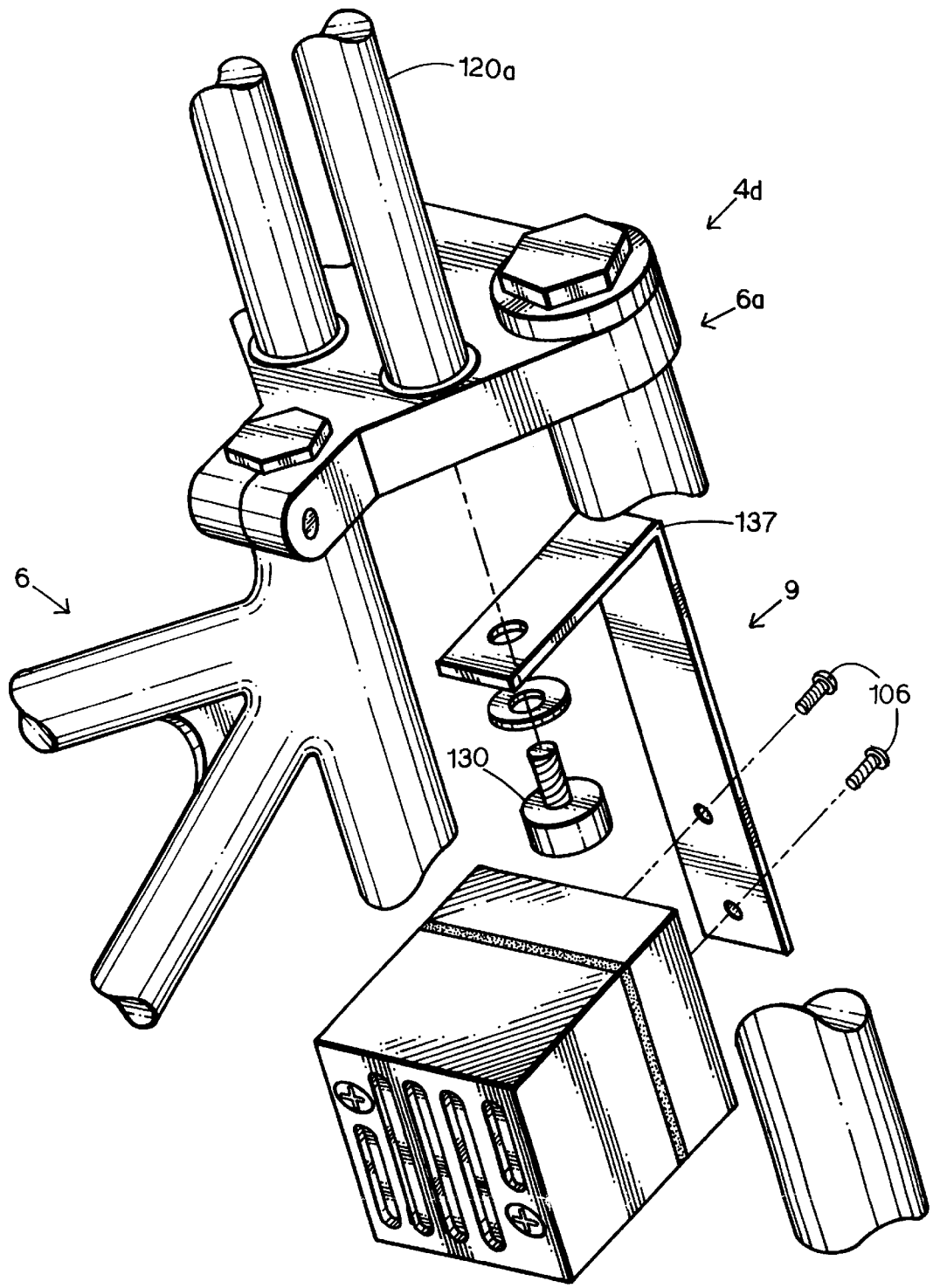
FIG. 4d is a perspective view of an installation of the modular wiring harness on a fourth type of motorcycle.

FIG. 4d shows a fourth alternative mounting arrangement for a motorcycle 4d with a stock, hooded headlight assembly (not shown). The wiring harness 2 utilizes a mounting bracket 137 placed on the left side (i.e., opposite side of the kickstand) and mounted on a handlebar riser bolt 130.

The wiring network 90 for the motorcycle 4d includes a primary harness which exits the bottom side of the system module 50 and is connected to the components and switching on the body of the motorcycle 4d, including the ignition switch 24, the tail/brake light 14b, the starter 18 and the indicator light array 76. A secondary harness exits the back of the system module 50 and is connected to the devices and switching on the handlebars 7 and on the motorcycle front end. The secondary harness comprises two branches, one of which is connected to the headlight 14a, the front turn signals 14c, a gauge, the flasher unit 70 and the dash indicator lights 14e. The second branch of the secondary harness includes the wiring 90 for the devices and switching mounted on the handlebars 7.

The wiring 90 is mounted on the motorcycle frame 6 by suitable twist ties 138, which can comprise, for example, the type which are self-locking. Using such twist ties, the wiring 90 is preferably secured to the frame 6 at regularly-spaced locations. The wiring 90 is preferably mounted on the frame 6 to avoid interference between moving parts thereof, such as the motorcycle frame 6 and the front subframe (wheel/fork/handlebar) assembly 6a. Thus, during installation the handlebars 7 should be swung from stop-to-stop to ensure that the wiring 90 includes sufficient slack to accommodate such full range movement. Moreover, parts of the motorcycle 4 which could damage the wiring 90, such as sharp edges and the exhaust system components, should be avoided with the wiring 90.

Any suitable arrangement for routing and securing the wiring network 90 may be employed with the present invention. For example, the wiring 90 could be taped in place or fastened with twist ties, or run through passages in the motorcycle frame 6 for concealing same. Likewise, the system and power modules 50, 52 can be placed at various locations on the motorcycle 4.

Common vehicle electrical designs utilize the vehicle frame for grounding, whereby most devices are grounded to the vehicle frame and the modular wiring harness 2 would primarily handle the positive sides of the circuits involved. However, the modular wiring harness 2 could also be employed with a positive ground vehicle with appropriate modifications. The modular wiring harness 2 can also be adapted for vehicle electrical systems which supply both positive and negative potential by means of the wiring network, i.e., which do not ground to a frame or chassis. Such vehicles could include, for example, boats and other vehicles constructed primarily of nonconductive materials, such as fiberglass.

It is to be understood that while certain forms of the present invention have been illustrated and described herein, it is not to be limited to the specific forms or arrangement of parts described and shown.

What is claimed and desired to be secured by Letters Patent is as follows:

1. A modular wiring harness for a vehicle including a frame; electrical source devices including a battery and generator means: electrical operating devices including lights and ignition; and electrical switching including an ignition switch and a light switch, which wiring harness comprises:
    (a) a wiring network including a plurality of individual wires extending among and interconnecting respective source devices, operating devices and switches; and
    (b) a system module including:
        (1) an enclosure with a wire opening, said enclosure having an interior;
        (2) a plurality of said wires extending through said enclosure wire opening and into the interior of said enclosure;
        (3) a circuit breaker in said enclosure interior connected to said wiring; and
        (4) an indicator light in said enclosure and connected to a respective wire and to said vehicle frame;
    (c) an enclosure;
    (d) wiring from said battery and a starter entering said power module;
    (e) a circuit breaker connected to said wiring in said power module; and
    (f) an indicator light connected to said wiring in said power module and to said vehicle frame;
    (g) said vehicle including a starter system with said starter, a starter solenoid and a starter switch;
    (h) a main circuit breaker connected to said battery and to said ignition switch and said generator means by a main power line;
    (i) a starter relay including a power input connected to said main power line and a power output connected to said starter;
    (j) said starter relay having a pair of inputs, one connected to said vehicle frame and the other connected to said starter switch through said system and power modules, said starter relay inputs being interchangeable;
    (k) a starter input indicator light connected to said starter relay inputs through a pair of diodes each connected to a respective starter relay input in parallel relationship;
    (l) a resistor connected in series with said pair of parallel diodes and in series with said starter relay input indicator light;
    (m) a starter relay output indicator light connected to said starter relay power output through a resistor positioned in series relationship therewith; and
    (n) said starter relay input and starter relay output indicator lights connected to said starter relay inputs through a pair of diodes each connected to a respective starter relay input line.

2. The wiring harness according to claim 1, which includes:
    (a) a flasher unit in said system module enclosure and connected to said lights and to said light switch.

3. The wiring harness according to claim 1, which includes:
    (a) said electrical switching including a starter switch;
    (b) said vehicle electrical operating devices including a starter; and
    (c) said power module including a starter relay with inputs connected to said vehicle frame, said starter switch and said battery and an output connected to said starter.

4. The wiring harness according to claim 3 wherein said power module includes:
    (a) a starter relay output indicator light connected to said starter relay output and to said vehicle frame; and
    (b) a starter relay input indicator light connected to said starter relay inputs from said vehicle frame and to said starter switch.

5. The wiring harness according to claim 1 wherein said power module includes:
    (a) a top;
    (b) a bottom;
    (c) a plurality of sides;
    (d) a bottom mounting screw connected to said power module enclosure bottom; and
    (e) a side mounting screw connected to one of said power module enclosure sides.

6. The wiring harness according to claim 1, which includes:
(a) said power module substantially filled with a non-conductive encapsulating potting material.

7. The wiring harness according to claim 1, which includes:
(a) said wiring network comprising a plurality of ribbons each comprising a plurality of said individual wires and each extending from said system module and each secured to said vehicle frame.

8. The wiring harness according to claim 1 wherein said enclosure includes:
(a) a base with a rim;
(b) a cover with a rim;
(c) a gasket engaged by said base and cover rims; and
(d) cover mounting means for mounting said cover on said base to form an enclosure interior substantially sealed by said gasket.

9. The wiring harness according to claim 8 wherein said system module enclosure includes:
(a) a pair of screw posts positioned within said enclosure interior;
(b) two pairs of system module enclosure assembly screws, each screw pair connected to one of said base and said cover and to said screw posts; and
(c) a pair of O-rings each engaging a respective screw head and said cover.

10. The wiring harness according to claim 8, which includes:
(a) said system module including a circuit board;
(b) said wiring being connected directly to said circuit board; and
(c) said enclosure base substantially filled with a nonconductive potting material substantially covering said circuit board.

11. The wiring harness according to claim 10, which includes:
(a) a pair of spade connectors each having a spade connector receiver mounted on said circuit board and open outwardly therefrom and said circuit breaker having a pair of spade connector blades each selectively receivable in a respective spade connector receiver.

12. The wiring harness according to claim 10, which includes:
(a) a plurality of direct solder connections of said wiring to said circuit board.

13. The wiring harness according to claim 8, which includes:
(a) said enclosure base having a bottom panel; and
(b) said wire opening being formed in said enclosure base bottom panel.

14. The wiring harness according to claim 8, which includes:
(a) said enclosure base having multiple sides; and
(b) said wiring opening being formed in a side of said enclosure base.

15. The wiring harness according to claim 1 wherein said power module includes:
(a) a circuit board mounted in said enclosure; and
(b) a plurality of spade connectors, each spade connector including a receiver mounted on said circuit board and a blade connected to said circuit breaker.

16. The wiring harness according to claim 1 wherein said system module includes:
(a) an array of said indicator lights each connected to said vehicle frame and to a respective switch and a respective device.

17. The wiring harness according to claim 1, which includes:
(a) said motorcycle having a pair of juxtaposed fuel tanks mounted on said frame with said ignition switch therebetween, said operating devices including a starter system comprising a starter and a starter solenoid, and said switching including a starter switch;
(b) a power module including an enclosure forming an interior, a starter relay in said interior and connected to said starter solenoid and to said starter switch, a starter relay input indicator light connected to an input of said starter relay and a starter relay output light connected to an output of said starter relay; and
(c) said system module and said power module mounted on said bracket between said fuel tanks.

18. In combination with a motorcycle including: a frame having a front subframe assembly pivotally mounted on a front end thereof; electrical source devices including a battery and generator means; electrical operating devices including a headlight mounted on said front subframe assembly and a tail/brake light mounted on a back end of said frame; and electrical switching including a headlight switch, a tail/brake light switch and an ignition switch, the improvement of a modular wiring harness, which comprises:
(a) a wiring network including a plurality of individual wires interconnecting respective source devices, operating devices and switching;
(b) connector means for connecting said wiring network to said source devices, operating devices and switches;
(c) wiring network fastening means for fastening said wiring network to said motorcycle frame;
(d) a system module including:
(1) an enclosure with an interior and a wiring opening to said interior;
(2) a plurality of said wires extending through said enclosure wire opening and into said enclosure interior;
(3) a circuit breaker in said enclosure interior connected to said wiring; and
(4) an indicator light positioned in said enclosure interior and connected to respective wires in said enclosure interior; and
(e) a system module mounting bracket connected to and mounting said system module on said vehicle frame;
(f) said motorcycle having a pair of juxtaposed fuel tanks mounted on said frame with said ignition switch therebetween, said operating devices including a starter system comprising a starter and a starter solenoid, and said switching including a starter switch;
(g) a power module including an enclosure forming an interior, a starter relay in said interior and connected to said starter solenoid and to said starter switch, a starter relay input indicator light connected to an input of said starter relay and a starter relay output light connected to an output of said starter relay; and
(h) said system module and said power module being mounted on said bracket between said fuel tanks.

19. The wiring harness according to claim 18, which includes:
(a) said power module having a top, a bottom and multiple sides;

(b) a side mounting screw connected to one of said enclosure sides and to said starter relay;

(c) a bottom mounting screw connected to said enclosure bottom and to the other said starter relay input;

(d) said power module having a first, top-up mounting position with said bottom mounting screw connected to said bracket and said side mounting screw connected to said starter switch; and (e) said power module having a second, side-up mounting position with said side mounting screw connected to said bracket and bottom mounting screw connected to said starter switch.

20. The wiring harness according to claim 18, which includes:

(a) said motorcycle having a pair of crash bars extending along the underside and the front of the frame behind the front wheel/fork/handlebar assembly and a crash bar crosspiece extending across said crash bars; and (b) said system module mounting means comprising a mounting plate connected to said cross bar and to said system module enclosure.

21. In combination with a motorcycle including: a frame having a front subframe assembly pivotally mounted on a front end thereof; electrical source devices including a battery and generator means; electrical operating devices including a headlight mounted on said front subframe assembly and a tail/brake light mounted on a back end of said frame; and electrical switching including a headlight switch, a tail/brake light switch and an ignition switch, the improvement of a modular wiring harness, which comprises:

(a) a wiring network including a plurality of individual wires interconnecting respective source devices, operating devices and switching;

(b) connector means for connecting said wiring network to said source devices, operating devices and switches;

(c) wiring network fastening means for fastening said wiring network to said motorcycle frame;

(d) a system module including:
  (1) an enclosure with an interior and a wiring opening to said interior;
  (2) a plurality of said wires extending through said enclosure wire opening and into said enclosure interior;
  (3) a circuit breaker in said enclosure interior connected to said wiring; and
  (4) an indicator light positioned in said enclosure interior and connected to respective wires in said enclosure interior; and (e) a system module mounting bracket connected to and mounting said system module on said vehicle frame;

(f) said motorcycle having a front frame subassembly pivotally connected to the frame;

(g) said front frame subassembly having an upper turning fork plate and a pair of handlebar risers mounted thereto by a pair of riser bolts; and (h) said system module mounting means comprising a bracket with an upper, horizontal flange connected to said plate by said riser bolts and a vertical flange depending downwardly from said upper flange and mounting said system module enclosure thereon.

22. The wiring harness according to claim 21, which includes:

(a) said system module mounting bracket upper flange having a pair of receivers each receiving a respective riser bolt.

\* \* \* \* \*